(12) United States Patent
Lee et al.

(10) Patent No.: US 8,432,778 B2
(45) Date of Patent: *Apr. 30, 2013

(54) OPTICAL DISC HAVING PLURALITY OF RECORDING LAYERS, AND METHOD AND APPARATUS FOR RECORDING DATA THEREON

(75) Inventors: Kyung-geun Lee, Seongnam-si (KR); Wook-yeon Hwang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/430,971

(22) Filed: May 10, 2006

(65) Prior Publication Data

US 2006/0203672 A1  Sep. 14, 2006

Related U.S. Application Data

(63) Continuation of application No. 11/205,010, filed on Aug. 17, 2005, which is a continuation of application No. 10/966,040, filed on Oct. 18, 2004.

(30) Foreign Application Priority Data

Jun. 23, 2004 (KR) .................................. 2004-46844

(51) Int. Cl.
*G11B 7/24* (2006.01)
(52) U.S. Cl.
USPC ................. 369/53.24; 369/59.25; 369/59.26; 369/94; 369/275.1

(58) Field of Classification Search .................. 369/94, 369/53.24, 59.25, 275.1, 59.26
See application file for complete search history.

(56) References Cited

U.S. PATENT DOCUMENTS

| 5,729,525 A | 3/1998 | Ishida et al. |
| 6,072,759 A | 6/2000 | Maeda et al. |
| 6,424,614 B1 * | 7/2002 | Kawamura et al. ........ 369/275.3 |

(Continued)

FOREIGN PATENT DOCUMENTS

| EP | 0 715 301 | 6/1996 |
| EP | 1 244 096 | 9/2002 |

(Continued)

OTHER PUBLICATIONS

U.S. Appl. No. 10/966,040, filed Oct. 18, 2004, Kyung-geun Lee et al, Samsung Electronics Co., Ltd.

(Continued)

*Primary Examiner* — Joseph Feild
*Assistant Examiner* — Linh N Hoffner
(74) *Attorney, Agent, or Firm* — NSIP Law (57) ABSTRACT

Provided are an optical disc having a plurality of recording layers, and a method and apparatus for recording data thereon. The optical disc has a plurality of recording layers, each recording layer including: a data area; a connecting area; and a remaining area. The data, connecting, and remaining areas are respectively disposed in a direction from an inner circumference of the optical disc to an outer circumference. An outer boundary of each of the data areas is determined according to an amount of data to be recorded. Locations of the connecting areas and the remaining areas are determined by a recording and/or reproducing apparatus according to the determination of the outer boundary of each of the data areas.

17 Claims, 5 Drawing Sheets

U.S. PATENT DOCUMENTS

| | | | |
|---|---|---|---|
| 7,072,255 | B2 | 7/2006 | Sasaki |
| 7,110,339 | B2 | 9/2006 | Suzuki |
| 7,623,432 | B2 | 11/2009 | Koppers et al. |
| 2002/0003760 | A1 | 1/2002 | Honda |
| 2002/0054554 | A1 | 5/2002 | Yamanaka |
| 2002/0136122 | A1 | 9/2002 | Nakano |
| 2002/0150013 | A1 | 10/2002 | Hsiao |
| 2002/0181376 | A1 | 12/2002 | Acker |
| 2003/0002420 | A1* | 1/2003 | Yoon et al. ............... 369/59.25 |
| 2003/0063535 | A1* | 4/2003 | Shoji et al. ............... 369/47.53 |
| 2003/0067859 | A1 | 4/2003 | Weijenbergh et al. |
| 2003/0137910 | A1 | 7/2003 | Ueda et al. |
| 2003/0137915 | A1 | 7/2003 | Shoji et al. |
| 2003/0185121 | A1 | 10/2003 | Narumi et al. |
| 2003/0227846 | A1 | 12/2003 | Lee et al. |
| 2004/0120241 | A1 | 6/2004 | Kobayashi et al. |
| 2004/0246852 | A1 | 12/2004 | Hwang et al. |
| 2004/0264322 | A1 | 12/2004 | Shishido et al. |
| 2005/0018572 | A1* | 1/2005 | Gushima et al. ........... 369/53.15 |
| 2005/0030873 | A1 | 2/2005 | Sasaki |
| 2005/0030874 | A1 | 2/2005 | Sasaki |
| 2005/0041555 | A1 | 2/2005 | Ogawa et al. |
| 2005/0207262 | A1 | 9/2005 | Terada et al. |
| 2005/0276187 | A1 | 12/2005 | Lee et al. |
| 2006/0181983 | A1* | 8/2006 | Martens et al. ............. 369/47.5 |
| 2006/0203684 | A1 | 9/2006 | Ko et al. |
| 2008/0037378 | A1* | 2/2008 | Tasaka et al. ............. 369/44.11 |
| 2008/0247305 | A1 | 10/2008 | Narumi et al. |
| 2010/0172227 | A1 | 7/2010 | Shoji et al. |
| 2010/0262985 | A1 | 10/2010 | Hirokane et al. |

FOREIGN PATENT DOCUMENTS

| | | |
|---|---|---|
| EP | 1 318 509 | 6/2003 |
| EP | 1 329 888 | 7/2003 |
| JP | 5-143997 A | 6/1993 |
| JP | 8-212561 A | 8/1996 |
| JP | 10-21673 | 1/1998 |
| JP | 2001-331940 A | 11/2001 |
| JP | 2002-358648 | 12/2002 |
| JP | 2002-373426 A | 12/2002 |
| JP | 2003-22532 A | 1/2003 |
| JP | 2004-362726 | 12/2004 |
| JP | 2007-521597 | 8/2007 |
| JP | 2008-503024 A | 1/2008 |
| KR | 2003-11102 | 2/2003 |
| WO | WO 02/23542 A1 | 3/2002 |
| WO | WO 2005/004119 | 1/2005 |
| WO | WO 2005/122155 | 12/2005 |

OTHER PUBLICATIONS

U.S. Appl. No. 11/205,010, filed Aug. 17, 2005, Kyung-geun Lee et al, Samsung Electronics Co., Ltd.
U.S. Appl. No. 11/429,101, filed May 8, 2006, Kyung-geun Lee et al, Samsung Electronics Co., Ltd.
U.S. Appl. No. 11/430,882, filed May 10, 2006, Kyung-geun Lee et al, Samsung Electronics Co., Ltd.
Search Report issued in International Patent Application No. PCT/KR2005/1869 on Sep. 26, 2005.
Woerlee P et al., "Format of an 8.5 GB Double-Layer DVD Recordable Disc," Apr. 18, 2004, Database Compendex [Online], Engineering Information, Inc., NY, US; XP-002540573, Database accession No. E2004528737406.
Royal Philips Electronics, "Double Layer DVD+R Multi-Medial Command Set Description", T10.org Documents, Jun. 4, 2004, Version 1.00, pp. 7-16.
Office Action and Search Report issued in corresponding Taiwanese Patent Application No. 094118120 dated Jun. 24, 2008.
Woerlee et al., "Format of an 8.5 GB double-layer DVD recordable disc," Proceedings of SPIE vol. 5380 (SPIE, Bellingham, WA, 2004).
Royal Philips Electronics, "Double Layer DVD+R Multi-Media Command Set Description, Version 1.00," Jun. 4, 2004, pp. 1-48 [online][retrieved on Jun. 20, 2006], Retrieved from the Internet <URL: http://www.licensing.philips.com/>.
Supplemental Search Report issued in European Application No. 05750784.0 on Jul. 21, 2008.
Canadian Office Action issued on Mar. 16, 2010, in counterpart Canadian Application No. 2 571 525 (4 pages).
Chinese Office Action issued on Apr. 26, 2010, in counterpart Chinese Application No. 200580020691.0 (9 pages, in Chinese, with complete English translation).
Japanese Office Action issued on Jan. 4, 2011, in counterpart Japanese Application No. 2007-517946 (10 pages, in Japanese, with complete English translation).
Japanese Notice of Allowance issued Aug. 7, 2012 in counterpart Japanese Patent Application No. 2012-092299 (3 pages, in Japanese).
European Search Report issued on Sep. 14, 2009, in counterpart European Application No. 09153307.5 (4 pages, in English).
Canadian Examination Report issued May 9, 2012 in counterpart Canadian Patent Application No. 2,571,525 (3 pages, in English).
Canadian Office Action issued on May 31, 2011, in counterpart Canadian Application No. 2 571 525 (4 pages, in English).
Final Rejection dated Dec. 13, 2011, in corresponding Japanese Patent Application No. 2007-517946 and English Translation thereof.
80mm and 120mm DVD-recordable disc (DVD-R), JISx6245, Japanese Standards Association, 1999, pp. 54-60, FIG. 58.
Canadian Office Action issued Feb. 25, 2013 in couterpart Canadian Application No. 2,571,525 (2 pages).

* cited by examiner

FIG. 1A (PRIOR ART)

| INNER ZONE | | DESCRIPTION | PURPOSE |
|---|---|---|---|
| LEAD-IN | PRE-RECORDED ZONE | CONTROL DATA ZONE | DISC-RELATED INFORMATION & COPY PROTECTION INFORMATION |
| | REWRITABLE AREA | BUFFER | ... |
| | | RESERVED | FUTURE EXTENSION |
| | | TEST ZONE | OPTIMUM POWER TEST ZONE |
| | | INFORMATION ZONE | INFORMATION RELATED TO RECORDING/REPRODUCING APPARATUS OR DISC STATUS |
| USER DATA AREA | | | |
| LEAD-OUT | | | - |

FIG. 1B (PRIOR ART)

| INNER ZONE | | DESCRIPTION | PURPOSE |
|---|---|---|---|
| LEAD-IN | PRE-RECORDED ZONE | CONTROL DATA ZONE | DISC-RELATED INFORMATION & COPY PROTECTION INFORMATION |
| | READ ONLY AREA | BUFFER | ... |
| | | RESERVED | ... |
| USER DATA AREA | | | |
| LEAD-OUT | | | - |

OPTICAL DISC HAVING PLURALITY OF RECORDING LAYERS, AND METHOD AND APPARATUS FOR RECORDING DATA THEREON

CROSS-REFERENCE TO RELATED APPLICATIONS

This application is a continuation of application Ser. No. 11/205,010 filed on Aug. 17, 2005, now pending, which is a continuation of application Ser. No. 10/966,040 filed on Oct. 18, 2004, now pending, which claims the benefit of Korean Patent Application No. 2004-46844 filed on Jun. 23, 2004, in the Korean Intellectual Property Office, the disclosures of which are incorporated herein by reference.

BACKGROUND OF THE INVENTION

1. Field of the Invention

The present invention relates to an optical disc, and more particularly, to an optical disc on which data can be recorded quickly and on which an exclusive region for a specified purpose can be selectively allocated at the outer circumference thereof, and a method of and an apparatus for recording data thereon.

2. Description of Related Art

Optical discs are used as data storage media of optical pickup devices for recording and reproducing data without contact. Two types of optical discs are compact discs (CDs) and digital versatile discs (DVDs), which differ according to recording capacity. Some are recordable, such as the 650 MB CD-R, 650 MB CD-RW, 4.7 GB DVD+R/RW, 4.7 GB DVD-RAM, and DVD-R/RW. Others are read-only, such as the 650 MB CD and 4.7 GB DVD-ROM. Furthermore, a next generation DVD whose recording capacity is over 15 GB is under development.

Presently, the only type of conventional recordable DVD is a 4.7 GB single layer disc. However, DVD-ROMs are available in 8.5 GB dual layer discs. In order to backup these 8.5 GB discs, an 8.5 GB recordable DVD is required. However, in this case, the recording time roughly doubles, which can be a disadvantage for the user. Although the recording speed can theoretically be improved, this would require improvements in disc technology and therefore, a method of effectively recording data at a conventional speed is required to immediately introduce the 8.5 GB recordable DVD to the market.

Figure 1A:
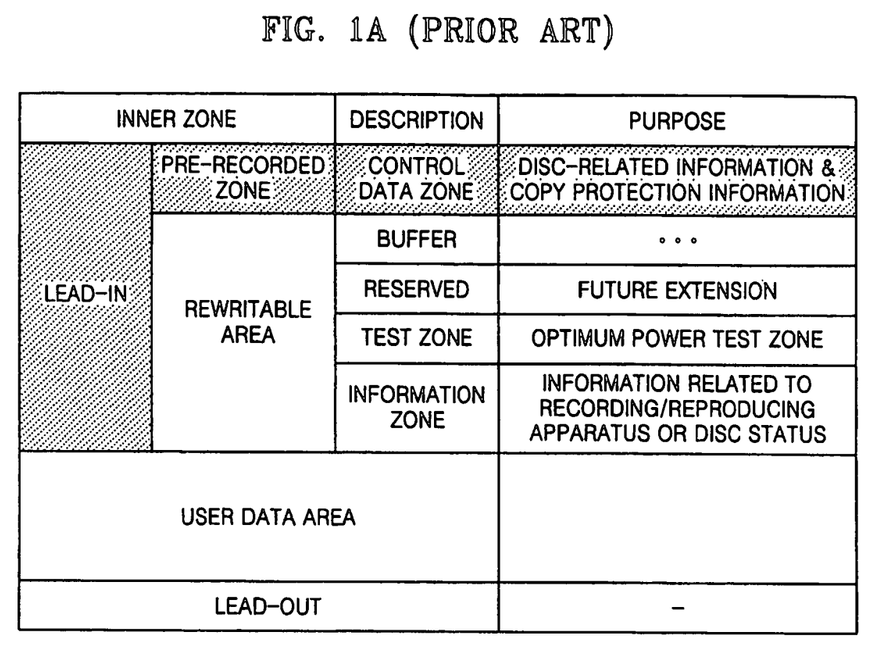
FIG. 1A illustrates the structure of a conventional rewritable optical disc.
Figure 1B:
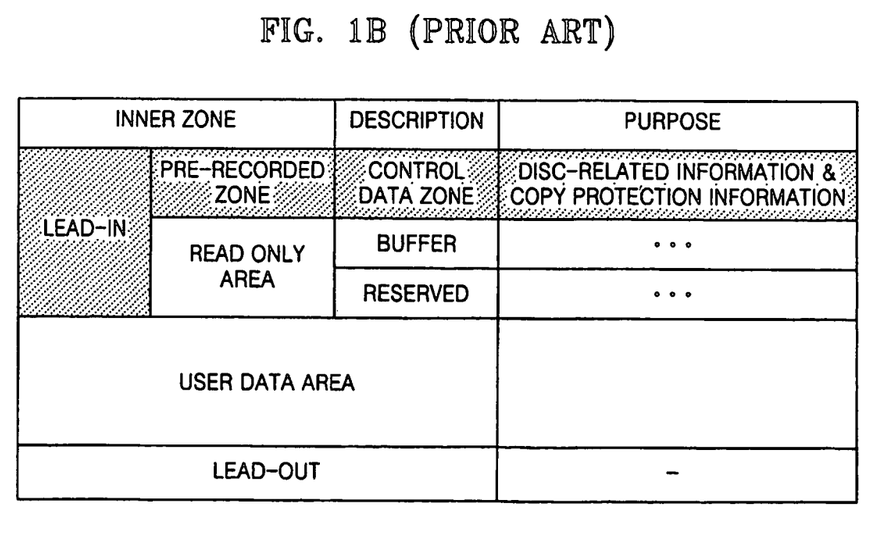
FIG. 1B illustrates the structure of a conventional read-only optical disc.

FIG. 1A illustrates the structure of a conventional rewritable optical disc. FIG. 1B illustrates the structure of a conventional read-only optical disc. The structure of a lead-out area of the rewritable optical disc shown in FIG. 1A is almost the same as the structure of a lead-in area.

Figure 2A:
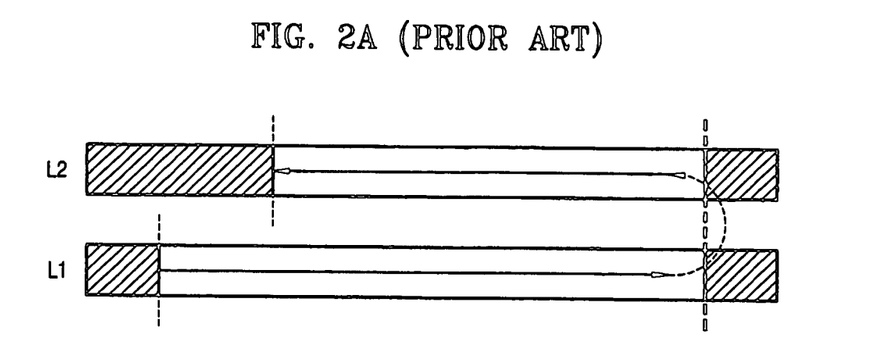
FIGS. 2A and 2B illustrate conventional methods of recording data on a dual recording layer disc.
Figure 2B:
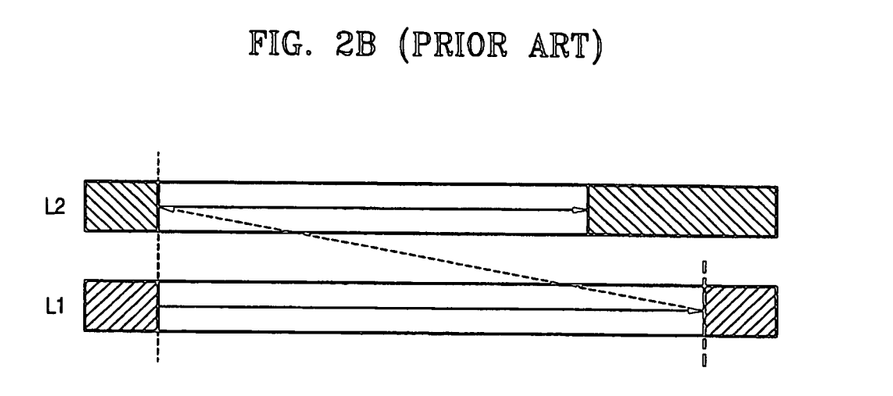

FIGS. 2A and 2B illustrate conventional methods of recording data on a dual recording layer disc. FIG. 2A shows the case where the recording direction is an opposite track path (OTP), and FIG. 2B shows the case where the recording direction is a parallel track path (PTP).

As shown in FIGS. 2A and 2B, user data is recorded on a recording layer L1, and then the remaining user data is recorded on a recording layer L2. Pattern data having a lead-out attribute is recorded on an area on which the user data cannot be recorded, in the recording layer L2. Commonly, the area connecting data storage layers to each other is called a connecting area, to discriminate from the lead-out area and the lead-in area. The recording methods shown in FIGS. 2A and 2B can be applied to read-only and rewritable discs.

Figure 3A:
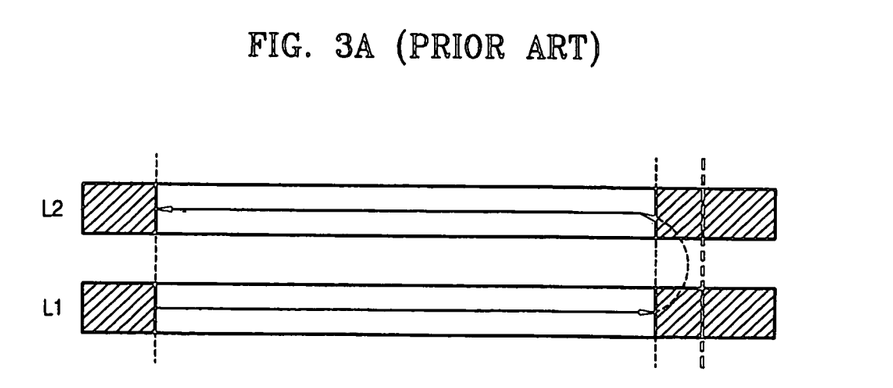
FIGS. 3A and 3B illustrate other conventional methods of recording data on a dual recording layer disc.
Figure 3B:
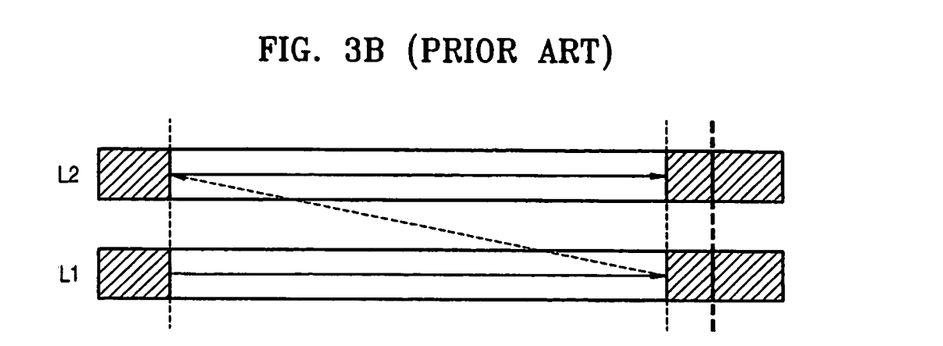

FIGS. 3A and 3B illustrate other conventional methods of recording data on a dual recording layer disc. FIG. 3A shows the case where the recording direction is an opposite track path (OTP), and FIG. 3B shows the case where the recording direction is a parallel track path (PTP). As shown in FIGS. 3A and 3B, if the total amount of data to be recorded is less than the total capacity of the two recording layers L1 and L2, then in order to record the same amount of data on each of the two recording layers L1 and L2, data is recorded up to a specified position before the lead-out area on each recording layer, and pattern data having the lead-out attribute is recorded on the remaining area. In particular, the pattern data having the lead-out attribute is recorded out to the outermost circumference of the disc.

Figure 4A:
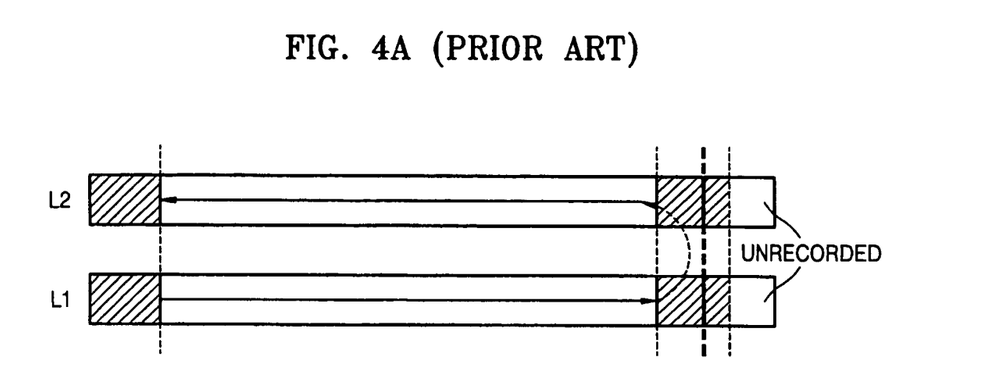
FIGS. 4A and 4B illustrate other conventional methods of recording data on a dual recording layer disc.
Figure 4B:
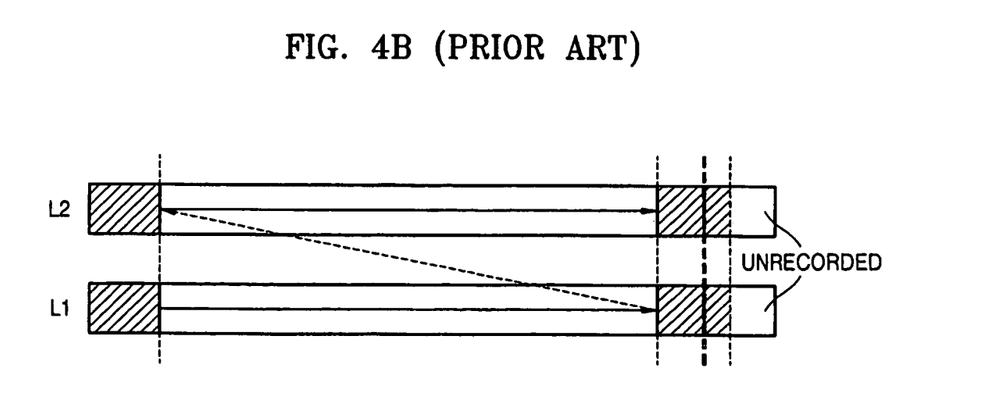

FIGS. 4A and 4B illustrate other conventional methods of recording data on a dual recording layer disc. FIG. 4A shows the case where the recording direction is the OTP, and FIG. 4B shows the case where the recording direction is the PTP. Like the recording methods shown in FIGS. 3A and 3B, the data recording methods shown in FIGS. 4A and 4B show the case where data is recorded up to a specified position before the lead-out area on each recording layer in order to record the same amount of data on each of the two recording layers L1 and L2, and pattern data having the lead-out attribute is recorded on the remaining area, when the total amount of data to be recorded is less than the total capacity of the two recording layers L1 and L2. However, unlike the recording methods shown in FIGS. 3A and 3B which record the pattern data having the lead-out attribute out to the outermost circumference of the disc, the data recording methods shown in FIGS. 4A and 4B record data only as far as necessary, and do not record the data out to the outermost circumference of the disc.

According to the conventional data recording methods described above, additional data recording time is required to record the pattern data having the lead-out attribute on the area on which user data cannot be recorded.

In the case of a recordable optical disc, a test area to record data for testing is allocated to the optical disc in order to record actual data at an optimum recording power before the actual data is recorded on the optical disc. However, in the case of an optical disc having a plurality of recording layers, since recording characteristics vary according to which recording layer data is recorded on first, the test area must be allocated considering the recording characteristics when the test area for an optimum power control (OPC) is allocated to the optical disc. In particular, when the test area is allocated to the outer circumference area of the optical disc, the characteristics of the outer circumference area must be considered. Also, the process is complicated by the fact that in an optical disc having a plurality of recording layers, the recording characteristics of the outer circumference area are worse than in an optical disc having a single recording layer. Furthermore, when the test area and an area having another purpose are allocated to the outer circumference area of the optical disc, the characteristics of the outer circumference area must also be considered.

BRIEF SUMMARY

An embodiment of the present invention provides an optical disc having a plurality of recording layers on which data can be recorded quickly and on which an exclusive area for a specified purpose can be selectively allocated at the outer area.

An embodiment of the present invention also provides a data recording method and apparatus for recording data on an optical disc having a plurality of recording layers quickly, and selectively allocating an exclusive area for a specified purpose to the outer area.

According to an aspect of the present invention, there is provided an optical disc having a plurality of recording layers, each recording layer including: a data area; a connecting area; and a remaining area. The data, connecting, and remaining areas are respectively disposed in a direction from an inner circumference of the optical disc to an outer circumference. An outer boundary of each of the data areas is determined according to an amount of data to be recorded. Locations of the connecting areas and the remaining areas are determined according to the determination of the outer boundary of each of the data areas.

According to another aspect of the present invention, there is provided an apparatus for recording/reproducing data, including: a write/read unit which transfers data with respect to an optical disc having a plurality of recording layers; and a controller which determines an outer boundary of a data area of each recording layer according to an amount of data to be recorded and which determines corresponding locations of a connecting area and a remaining area of each recording layer according to the determination of the outer boundary of each of the data areas.

According to another aspect of the present invention, there is provided a method of recording data on a plurality of recording layers, the method including: determining an outer boundary of a data area of each recording layer according to an amount of data to be recorded; and determining locations of a connecting area and a remaining area of each recording layer according to the determination of the outer boundary of each of the data areas.

According to another aspect of the present invention, there is provided a computer readable medium having recorded thereon a computer readable program for performing a method of recording data on a plurality of recording layers, the method including: determining an outer boundary of a data area of each recording layer according to an amount of data to be recorded; and determining locations of a connecting area and a remaining area of each recording layer according to the determination of the outer boundary of each of the data areas.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENT

Reference will now be made in detail to an embodiment of the present invention, examples of which are illustrated in the accompanying drawings, wherein like reference numerals refer to the like elements throughout. The embodiment is described below in order to explain the present invention by referring to the figures.

Figure 5:
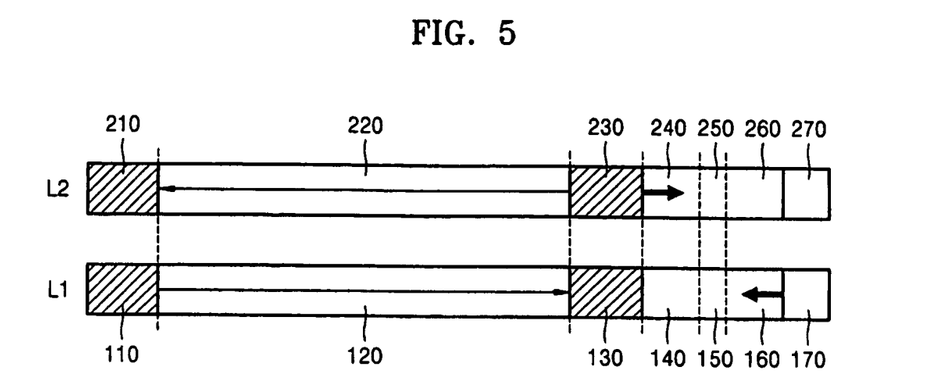
FIG. 5 illustrates the structure of an optical disc according to an embodiment of the present invention.

FIG. 5 illustrates the structure of an optical disc according to an embodiment of the present invention. The optical disc shown in FIG. 5 is a dual layer rewritable optical disc having two recording layers L1 and L2. The recording layer L1 includes a lead-in area 110, a first data area 120, a first connecting area 130, a first non-usage area 140, a first buffer area 150, a first exclusive area 160, and a first non-recording area 170. The recording layer L2 includes a lead-out area 210, a second data area 220, a second connecting area 230, a second exclusive area 240, a second buffer area 250, a second non-usage area 260, and a second non-recording area 270.

A non-limiting example of the detailed structure of the lead-in area 110 is the structure shown in FIG. 1. The structure of the lead-out area 210 is similar to the structure of the lead-in area 110. However, it is to be understood that other structures can be used.

The first data area 120 and the second data area 220 are areas on which to record user data. Data having a specified pattern indicating the end of the first or second data area 120 or 220 is recorded on the first connecting area 130 and the second connecting area 230, respectively. A data recording/reproducing apparatus (such as that shown in FIG. 7) recognizes the respective first or second connecting area 130 or 230 after the first or second data area 120 or 220 by reading the data having the specified pattern. In general, data having a lead-out attribute is recorded as the data having the specified pattern.

The first exclusive area 160 and the second exclusive area 240 are used for a specific purpose by the data recording/reproducing apparatus. For example, the first exclusive area 160 and the second exclusive area 240 are test areas for an optimum power control (OPC). The OPC means that an optimum recording power is determined in the data recording/reproducing apparatus through a preliminary test, before the user data is recorded on the rewritable disc. However, the first exclusive area 160 and the second exclusive area 240 may be used for at least another purpose. For example, the first exclusive area 160 and the second exclusive area 240 may be used to record data indicating the time of recording and the type of data recording/reproducing apparatus. The data recording/reproducing apparatus determines the size of the first exclusive area 160 and the second exclusive area 240 and whether or not they are allocated.

When data is recorded on an optical disc having a plurality of recording layers, if the amount of user data to be recorded is less than the total recordable capacity of the optical disc, and if the amount of user data to be recorded is known to a data recording/reproducing apparatus in advance, then the data recording/reproducing apparatus determines the size of each of the data areas 120 and 220 to record the same amount of user data on each of the plurality of recording layers.

Since the beginning locations of the data areas 120 and 220 are specified, then if the size of each of the data areas 120 and 220 is determined, the ending locations of the data areas 120 and 220 are also determined. If the locations of the data areas 120 and 220 are determined, the locations of the connecting areas 130 and 230 having a specified size are determined. Finally, it is determined whether or not to allocate the first exclusive area 160 and the second exclusive area 240. The size of each of the first exclusive area 160 and the second exclusive area 240 is determined by the data recording/reproducing apparatus later according to the usage frequency of the exclusive area 160 or 240. Since the beginning locations of the first exclusive area 160 and the second exclusive area 240 are specified, then if the size of each of the exclusive areas 160 and 240 is determined, ending locations of the exclusive areas 160 and 240 are also determined.

Various methods may be used to determine whether or not to allocate the first exclusive area 160 and the second exclusive area 240. For example, if the size of the first data area 120 and the second data area 220 are determined, then the locations of the connecting areas 130 and 230 having a specified size are determined. If the locations of the connecting areas 130 and 230 are determined, the size of each of remaining areas from the outer boundaries of the connecting areas 130 and 230 to the outermost circumference is calculated. The data recording/reproducing apparatus allocates the first exclusive area 160 or the second exclusive area 240 to the optical disc when the size of each of remaining areas is larger than a specified standard value. As a non-limiting example, 3% of the total amount of data that can be recorded on one recording layer L1 or L2 may be used as the specified standard value. However, it is to be understood that other amounts can be used.

When the first exclusive area 160 or the second exclusive area 240 is allocated, data indicating the fact is recorded on a specified area, e.g., the lead-in area 110.

The directions of the first exclusive area 160 and the second exclusive area 240 are opposite to each other, and the direction of each exclusive area 160 or 240 is opposite to that of the data area 120 or 220 in the recording layer L1 or L2 in which that exclusive area 160 or 240 exists. Referring to FIG. 5, the direction of the first data area 120 in the recording layer L1 is outward, and the direction of the first exclusive area 160 is inward. On the other hand, the direction of the second data area 220 in the recording layer L2 is inward, and the direction of the second exclusive area 240 is outward.

The first non-usage area 140 and the second non-usage area 260 are completely unused. In an optical disc having a plurality of rewritable recording layers, recording characteristics vary according to which recording layer is recorded first. In particular, the recording characteristics of the outer area of the optical disc are worse than in the inner area. Therefore, no data is recorded by designating an area of the recording layer L2 located at the same location with the first exclusive area 160 as the second non-usage area 260. Likewise, no data is recorded by designating an area of the recording layer L1 located at the same location with the second exclusive area 240 as the first non-usage area 140.

The first buffer area 150 and the second buffer area 250 are prepared considering influences caused by eccentricity of the optical disc and a beam focused on another recording layer. Like the first non-usage area 140 and the second non-usage area 260, no data is recorded on the first buffer area 150 and the second buffer area 250.

Figure 6:
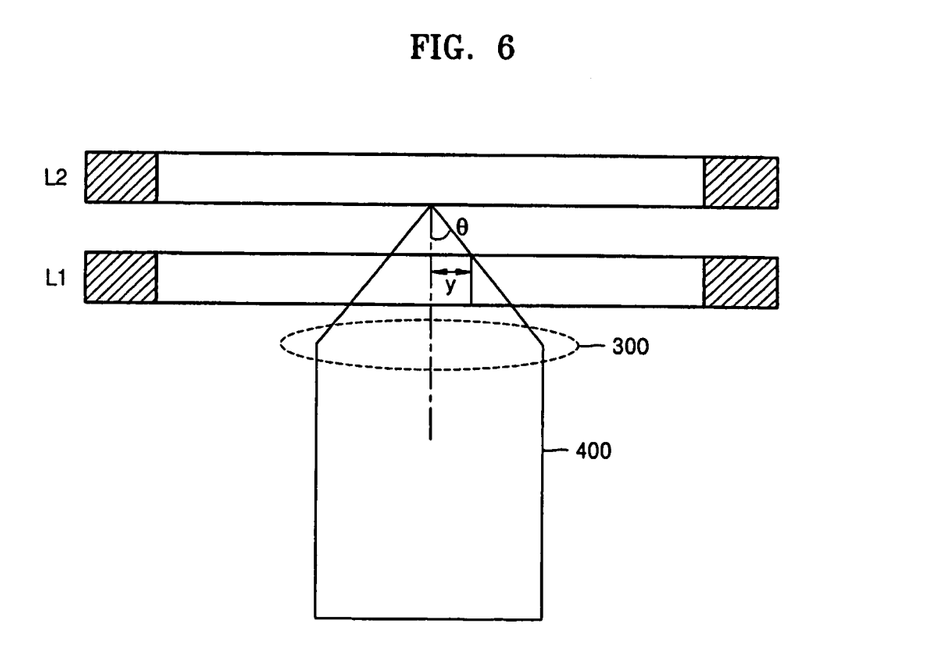
FIG. 6 illustrates a zone of a recording layer L1 affected by a beam focused on a recording layer L2 of the optical disc of FIG. 5.

FIG. 6 illustrates a zone of the recording layer L1 affected by a beam focused on the recording layer L2. Referring to FIG. 6, when a beam 400 is focused on a specific position of the recording layer L2 through an objective lens 300 of a data recording/reproducing apparatus, a zone of the recording layer L1 corresponding to a radius y is affected by the beam 400. The first buffer area 150 and the second buffer area 250 are allocated to a proper size considering the influence of the beam 400 radiated to record data on another recording layer and the eccentricity of the optical disc.

The first non-recording area 170 and the second non-recording area 270 are located on the outmost circumference of the disc and are designated as areas on which data is not recorded to compensate for bad recording characteristics. However, the first non-recording area 170 and the second non-recording area 270 may not be allocated.

An exemplary optical disc having dual recording layers has been described above. However, it is to be understood that the present invention is not limited to this example. Indeed, it is contemplated that the present invention may be applied to optical discs having more than two recording layers.

Figure 7:
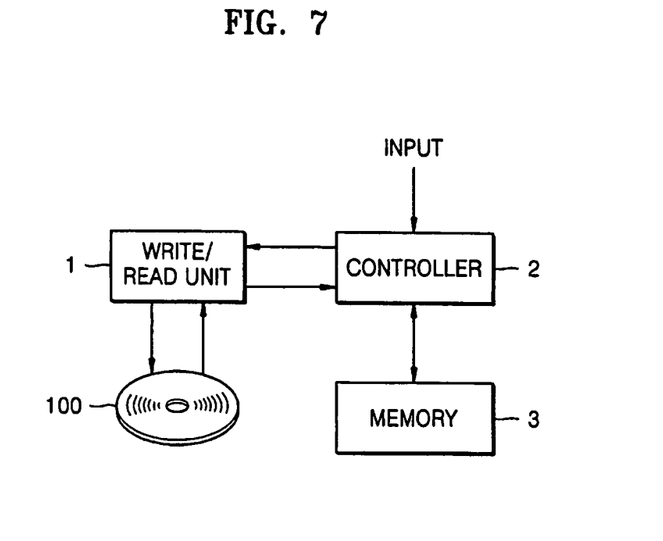
FIG. 7 is a block diagram of a data recording/reproducing apparatus according to an embodiment of the present invention.

FIG. 7 is a block diagram of a data recording/reproducing apparatus according to an embodiment of the present invention. Referring to FIG. 7, the apparatus includes a write/read unit 1, a controller 2, and a memory 3. An optical disc 100 has the structure shown in FIG. 5 according to an embodiment of the present invention.

The write/read unit 1 records data on the optical disc 100 or reads the recorded data, under the control of the controller 2. User data to be recorded on the optical disc 100 is temporarily stored in the memory 3 under the control of the controller 2. Also, data read from the optical disc 100, or various kinds of control data generated during recording or reproducing, is stored in the memory 3.

Referring to FIGS. 5 and 7, the controller 2 determines the size and location of each area of the optical disc 100 as described above. In particular, the controller 2 determines the allocation and location of the first exclusive area 160 and the second exclusive area 240.

The operation of the controller 2 will now be described in more detail. The controller 2 determines the size of the first data area 120 and the second data area 220, to record the same amount of user data on each of a plurality of recording layers when the amount of user data to be recorded on the optical disc 100 is less than the total recordable capacity of the optical disc 100.

Since the beginning (i.e., start) locations of the data areas 120 and 220 are specified, then if the size of each of the data areas 120 and 220 is determined, the ending locations of the data areas 120 and 220 are determined. If the locations of the data areas 120 and 220 are determined, the locations of the connecting areas 130 and 230 having a specified size are automatically determined.

The controller 2 determines whether or not to allocate the exclusive areas 160 and 240 of the recording layers L1 and L2 according to a specified standard. For example, if the sizes of the first data area 120 and the second data area 220 are determined, and if the locations of the connecting areas 130 and 230 having a specified size are determined, the controller 2 can calculate the size of each of the remaining areas from the outer boundaries of the connecting areas 130 and 230 to the outermost circumference. The controller 2 allocates the first exclusive area 160 or the second exclusive area 240 to the optical disc 100 when the size of each of remaining areas is larger than a specified standard value. As a non-limiting example, 3% of the total amount of data that can be recorded on one recording layer L1 or L2 may be used as the specified standard value.

When the first exclusive area 160 or the second exclusive area 240 is allocated, the controller 2 controls the write/read unit 1 to record data indicating that the first exclusive area 160 or the second exclusive area 240 has been allocated on a specified area, e.g., the lead-in area 110.

As described above, the directions of the first exclusive area 160 and the second exclusive area 240 are opposite to each other, and the direction of each exclusive area 160 or 240 is opposite to the direction of the data area 120 or 220 in the recording layer L1 or L2 in which that exclusive area 160 or 240 exists.

In an optical disc having a plurality of rewritable recording layers, the recording characteristics vary according to which recording layer is recorded first, and the recording characteristics of the outer area of the optical disc are worse than in the inner area. Therefore, the controller 2 designates an area of the recording layer L2 at the same location as the first exclusive area 160 as the second non-usage area 260. Likewise, the controller 2 designates an area of the recording layer L1 at the same location as the second exclusive area 240 as the first non-usage area 140.

The controller 2 allocates the first buffer area 150 and the second buffer area 250 considering influences caused by eccentricity of the optical disc and a beam focused on another recording layer. While described in terms of a recording/reproducing apparatus, it is to be understood that the apparatus need not perform both recording and reproduction.

Aspects of the present invention may be embodied in a general-purpose or a specific-purpose computer by running a program from a computer readable medium, including but not limited to storage media such as magnetic storage media (ROMs. RAMs, floppy disks, magnetic tapes, etc.), and optically readable media (CD-ROMs, DVDs, etc.). The present invention may be embodied as a computer readable medium having a computer readable program code unit embodied therein for causing a number of computer systems connected via a network to effect distributed processing. The present invention may also be embodied in a carrier wave (such as a transmission over the Internet).

As described above, according to an embodiment of the present invention, exclusive areas can be selectively allocated for a specified purpose, to allow data to be recorded quickly, and to allow data to be recorded reliably on the outer area of the optical disc.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of reproducing data from a plurality of recording layers of an optical recording medium, each of the recording layers comprising a user data area, a connecting area, and a remaining area, the method comprising:

reproducing user data recorded in the user data area of each of the recording layers;

wherein in each of the recording layers, the user data area has an outer boundary that was determined according to an amount of data that was recorded on the optical recording medium;

in each of the recording layers, locations of the connecting area and the remaining area were determined according to the determined outer boundary of the user data area;

in each of the recording layers, the user data area, the connecting area, and the remaining area are sequentially arranged in a direction from an inner circumference of the optical recording medium to an outer circumference of the optical recording medium so that the connecting area is after the user data area in the direction, and the remaining area is after the connecting area in the direction;

in each of the recording layers, the remaining area comprises an exclusive area for a specified purpose, an unused area, and a buffer area;

in each of the recording layers, a usage direction of the exclusive area is different from a usage direction of the user data area; and in each of the recording layers, the connecting area stores predetermined data.

2. The method of claim 1, further comprising, in each of the recording layers:

using the exclusive area for the specified purpose beginning at a beginning position of the exclusive area; and
determining an ending position of the exclusive area.

3. The method of claim 1, wherein in each of the recording layers, the usage direction of the exclusive area is opposite to the usage direction of the exclusive area of each adjacent one of the recording layers.

4. The method of claim 1, wherein in each of the recording layers, the unused area is positioned at a location corresponding to a location of the exclusive area of each adjacent one of the recording layers.

5. The method of claim 1, wherein in each of the recording areas, the usage direction of the user data area is opposite to the usage direction of the exclusive area.

6. The method of claim 1, wherein in each of the recording layers, the exclusive area is a test area usable to determine optimum recording conditions.

7. The method of claim 1, wherein in each of the recording layers, the predetermined data stored in the connecting area comprises data having a specified pattern indicating an end of the user data area.

8. The method of claim 7, wherein in each of the recording layers, the data having the specified pattern comprises a lead-out attribute.

9. The method of claim 1, wherein in each of the recording layers, the specified purpose is using the exclusive area as a test area for an optimum power control (OPC), or using the exclusive area to record data indicating a time of recording and a type of data recording/reproducing apparatus used to perform the recording.

10. The method of claim 1, wherein when an amount of user data to be recorded on the optical recording medium is known in advance and is less than a total amount of user data recordable on the optical recording medium, an amount of user data that is recorded in the user data area of each of the recording layers is equal to an amount of user data that is recorded in the user data area of each other one of the recording layers.

11. The method of claim 1, wherein in each of the recording layers, a size of the exclusive area is determined based on a usage frequency of the exclusive area.

12. The method of claim 1, wherein in each of the recording layers, the exclusive area is allocated when a size of the remaining area is greater than 3% of a total amount of user data recordable in the user data area.

13. A non-transitory computer-readable storage medium storing a computer program for controlling one or more computers to perform the method of claim 1.

14. The method of claim 1, wherein in each of the recording layers, an inner periphery of the connecting area abuts an outer periphery of the user data area, and an outer periphery of the connecting area abuts an inner periphery of the remaining area.

15. The method of claim 1, wherein in each of the recording layers, the exclusive area is not allocated if a size of the remaining area is not larger than a specified size.

16. The method of claim 1, wherein in each of the recording layers, the buffer area abuts the exclusive area and the unused area.

17. A method of reproducing data from a plurality of recording layers of an optical recording medium, the method comprising:

detecting a connecting area of each of the recording layers that is separate from a data area of the corresponding recording layer; and according to the detected connecting areas, reproducing data from the data area of each of the recording layers;

wherein in each of the recording layers, the data area has an outer boundary that was determined according to an amount of data that was recorded on the optical recording medium;

in each of the recording layers, locations of the connecting area and a remaining area of the recording layer were determined according to the determined outer boundary of the data area;

the recording layers comprise a first recording layer and a second recording layer;

the first recording layer comprises a first data area, a first connecting area, and a first remaining area sequentially arranged in a direction from an inner circumference of the optical recording medium to an outer circumference of the optical recording medium so that the first connecting area is after the first data area in the direction, and the first remaining area is after the first connecting area in the direction;

the second recording layer comprises a second data area, a second connecting area, and a second remaining area sequentially arranged in the direction from the inner circumference of the optical recording medium to the outer circumference of the optical recording medium so that the second connecting area is after the second data area in the direction, and the second remaining area is after the second connecting area in the direction;

the first remaining area of the first recording layer comprises a first unused area, a first buffer area, and a first OPC (optimum power control) area;

the second remaining area of the second recording layer comprises a second OPC area, a second buffer area, and a second unused area;

in the first recording layer, an inner periphery of the first unused area abuts an outer periphery of the first connecting area, an outer periphery of the first unused area abuts an inner periphery of the first buffer area, and an outer periphery of the first buffer area abuts an inner periphery of the first OPC area; and in the second recording layer, an inner periphery of the second OPC area abuts an outer periphery of the second connecting area, an outer periphery of the second OPC area abuts an inner periphery of the second buffer area, and an outer periphery of the second buffer area abuts an inner periphery of the second unused area.

* * * * *